No. 629,328. Patented July 25, 1899.
C. E. BERTELS.
CLUTCH MECHANISM.
(Application filed Sept. 14, 1898.)
(No Model.)
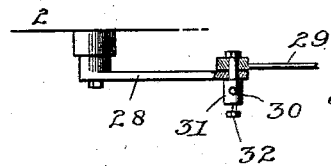
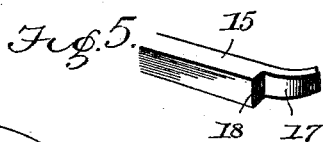
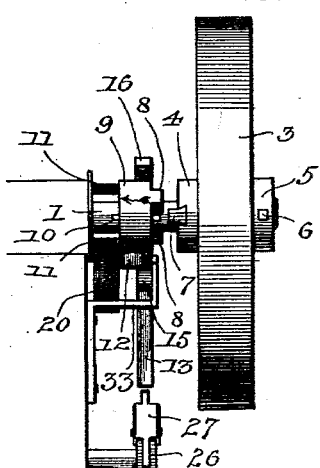
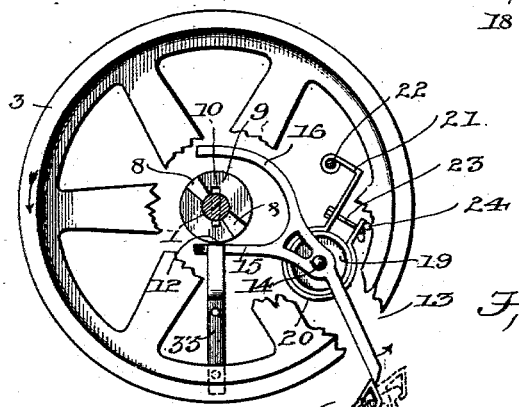
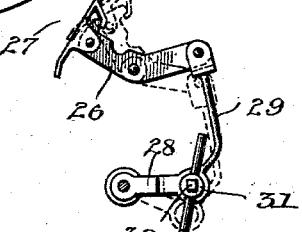
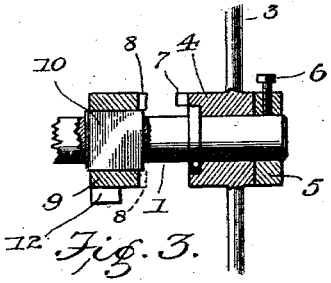
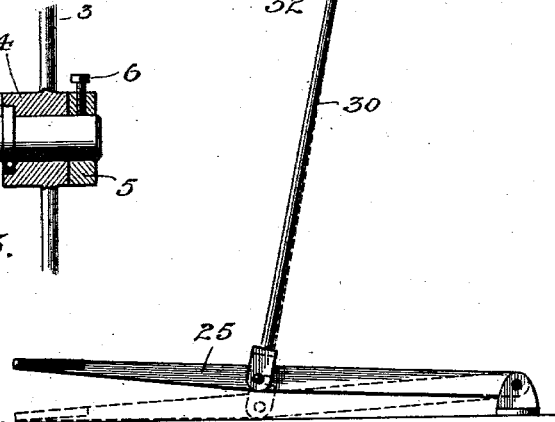
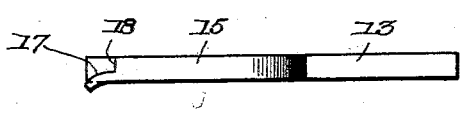
Witnesses
Charles E. Bertels, Inventor
By his Attorneys,

UNITED STATES PATENT OFFICE.

CHARLES ELMER BERTELS, OF WILKES-BARRÉ, PENNSYLVANIA.

CLUTCH MECHANISM.

SPECIFICATION forming part of Letters Patent No. 629,328, dated July 25, 1899.

Application filed September 14, 1898. Serial No. 690,943. (No model.)

*To all whom it may concern:*

Be it known that I, CHARLES ELMER BERTELS, a citizen of the United States, residing at Wilkes-Barré, in the county of Luzerne and State of Pennsylvania, have invented a new and useful Clutch Mechanism, of which the following is a specification.

My invention relates to a clutch or stop-motion particularly adapted for use in connection with stamping-machines, cutting-presses, squaring-shears, and other analogous machines, the object in view being to provide a clutch adapted to perform its functions as a stop-motion irrespective of irregularity of operation or carelessness upon the part of the operator. There is a class of machines wherein one complete revolution of the driving-shaft is necessary for each step in the operation, while the movement of the driving-shaft beyond such single complete revolution is undesirable and not only detracts from the accuracy and completeness of operation of the machine, but involves the risk of injury to the operator. In said class of machines it is usual to employ a foot or hand lever to start the machine or throw the shiftable member of the clutch into operative relation with the other member in order to communicate the motion of the driving-wheel or pulley to the mechanism, suitable devices being provided for throwing the clutch out of operation at the end of one complete revolution of the shaft; and it is the object of my invention to so locate and construct the parts that at the end of a single revolution of the driving-shaft the disengagement of the shifting member of the clutch will be accomplished automatically and wholly without reference to the existing position of the operating-lever, whereby in case of a protracted depression of the operating-lever by reason of inadvertence upon the part of the operator the prompt checking of the mechanism at the end of a complete revolution of the driving-shaft will not be omitted.

Further objects and advantages of this invention will appear in the following description, and the novel features thereof will be particularly pointed out in the appended claims.

In the drawings, Figure 1 is a front view of a clutch mechanism constructed in accordance with my invention. Fig. 2 is a side view of the same, showing in full and dotted lines different positions of the disconnected shifting devices. Fig. 3 is a detail sectional view of the clutch members and contiguous parts. Fig. 4 is an inverted plan view of the trip-lever. Fig. 5 is a detail view in perspective of the trip-arm of the trip-lever. Fig. 6 is a detail sectional view of the swivel and adjacent parts of the swinging arm.

Similar numerals of reference indicate corresponding parts in all the figures of the drawings.

Inasmuch as the clutch mechanism embodying my invention may be used in connection with various forms of machines requiring a stop-motion, it will be sufficient for the purposes of illustration to show a driving-shaft 1, suitably mounted upon a supporting-frame 2, which may be of any desired construction, according to the mechanism with which the device is used, and a driving-wheel or pulley 3, loosely mounted for rotation upon said shaft and adapted to receive motion from any suitable source of power in connection with the improved clutching devices. In the construction illustrated the hub 4 of the pulley or driving-wheel 3 is held from axial displacement upon said shaft by means of a collar 5, locked in place by a bolt 6, said hub at its inner end forming one member—namely, the permanently-positioned member—of the clutch and having one or more lugs 7 for engagement by corresponding lugs 8 on the movable or shiftable clutch member 9, said movable clutch member being mounted for axial adjustment upon the shaft 1 and being held from independent rotation with relation thereto by means of a key or feather 10. The movable clutch member is constructed and provided with actuating devices to insure its automatic engagement with the permanently-positioned clutch member when released, said movable clutch member being actuated by yielding devices, such as springs 11, which have a permanent tendency to throw the clutch into operation.

In addition to the clutching or engaging lug 8 the movable clutch member is provided with a shifting lug or projection 12, in operative relation with which is arranged a trip-lever 13, fulcrumed upon a pin or bolt 14 and bifurcated or forked to form a shifting-arm 15 and a return-arm 16, occupying positions, respectively, upon opposite sides of the movable or shiftable clutch member 9. The shifting-arm 15 of the trip-lever is provided with a cam-face 17, disposed obliquely with relation to the length of the lever, with its free end located at a point inside of the path of the shifting-lug 12, when the movable or adjustable clutch member is in its normal or engaged position, as will be seen by reference to Fig. 2, and inclining inwardly from said extremity, whereby as the shifting lug traverses the same during the rotation in the direction indicated by the arrow in Fig. 2 the movable clutch member is moved in the direction indicated by the arrow in Fig. 1 or inwardly from the permanently-positioned clutch member upon the driving-wheel, the extent of movement in this direction being sufficient to withdraw the lugs 8 from operative relation with those on the hub of said wheel. At the inner end of this cam-face the shifting-arm of the lever 13 is provided with a stop-shoulder 18, which is located directly in the path of the movement of the lug 12 when the clutch member 9 is in its shifted position. After the engagement of the lug 12 with the cam 17 and the checking of the rotary movement of the clutch member 9 by contact with the stop-shoulder 18 and the release of said clutch member to allow subsequent engagement with the permanently-positioned clutch member it is necessary to withdraw the shifting-cam 17 from the path of the lug 12 by throwing the rear end of the lever 13 in the direction indicated by the arrow in Fig. 2. This depresses the free end of the return-arm 16 of said lever into a position in the path of the lug 12, whereby when the clutch member 9 has made approximately one-half a revolution said lug 12 comes in contact with the return-arm 16, which also has a cam-faced inner side, and moves the trip-lever to its normal position, (indicated in Fig. 2,) with the shifting-cam 17 in a position to again engage and throw the movable member 9 of the clutch into its retracted or disengaged position.

In order that the trip-lever may be maintained in either of its adjusted positions—namely, with either of its arms in operative relation with the movable or adjustable clutch member—I have found it desirable to provide the same with a friction hub or drum 19, which is embraced by a brake-shoe 20, having an arm 21 secured, as by a bolt 22, to the supporting-frame 2 and provided with adjusting devices, such as a bolt 23, having a terminal thumb-nut 24. The frictional contact between the brake-shoe 20 and the periphery of the hub or drum 19 is sufficient to maintain the trip-lever in either of the positions above described—namely, with either of its arms in operative relation with the clutch member 9—without, however, interfering with the prompt shifting of said lever from one position to the other.

It now remains to describe an important feature of the apparatus whereby the above-described automatic return of the trip-lever to its normal or "stopping" position may be accomplished without allowing the operating devices to affect such automatic adjustment. It is obviously necessary to accomplish that movement of the trip-lever which is required to release the adjustable member of the clutch, and the devices which I have provided for this purpose include an operating-lever 25, consisting of a foot-treadle and a shifting-lever 26, operatively connected with said operating-lever and having a trip 27, yieldingly mounted upon the shifting-lever to engage the trip-arm 13. The normal position of this trip 27 is such that when the lever 25 is actuated to throw the shifting-lever 26 said trip engages the arm 13 and moves it in a direction indicated by the arrow in Fig. 2; but after thus throwing the trip-lever to its adjusted position the trip is located out of operative relation with the extremity of the trip-lever, whereby the shifting-lever 26 may return to its normal position independently of the trip-lever and also whereby the trip-lever may be returned to its normal position by the engagement of the lug 12 with the return-arm 16 of said lever independently of the shifting-lever 26. The trip 27 is pivotal to allow it to fold, and thus allow the return of either of the parts 13 and 26, whereby after the movement of the lever 26 to its adjusted position (indicated in dotted lines in Fig. 2) the continued depression of the lever 25 or the maintenance of said lever in its depressed position will not interfere in any way with the prompt return of the trip-lever 13 to its normal position by the operation of the lug 12 with relation to the return-arm 16. In other words, I have provided a relation between the shifting and trip levers whereby motion may be communicated in one direction from the former to the latter, but whereby movement of either of said members may be accomplished in the opposite direction independently of the other member. After the shifting-lever has accomplished the desired movement of the trip-lever the trip 27 is disengaged from the trip-lever and drops out of the path thereof, whereby the independent return movements above mentioned are possible without either of the parts 13 and 26 being affected by the other.

The construction of the connections between the operating-lever 25 and the shifting lever 26 may vary; but those means which I have found to be efficient include a swinging arm 28, connected by a link 29 with the rear end of the shifting-lever 26, and a pitman 30, pivotally connected at one end with the operating-lever 25 and having adjustable connection with a swivel 31 on the free end of the arm 28, said pitman being secured at the desired adjustment with relation to the swivel by means of a locking-screw 32. When the foot-lever 25 is depressed, the arm 28 is correspondingly actuated, and this motion is communicated to the rear arm of the shifting-lever 26 to throw said lever to the dotted position indicated in Fig. 2. To prevent lateral deflection of the free end of the trip-arm 15, I preferably employ a guide 33. (Shown clearly in Fig. 1.)

From the above description it will be seen that the essential elements of my improved clutch mechanism reside in means for automatically returning the trip to its normal position whereby the return is accomplished without manual intervention, and, in the second place, in the use of a disconnected operating-lever whereby the shifting of the trip-lever to its adjusted position is accomplished, the arrival of the trip-lever at its adjusted position being accompanied by the complete disconnection of the operating devices from said lever, whereby the subsequent return of either of said members to its normal position is accomplished independently of the other member. Therefore if through inadvertence or otherwise the operator should neglect to release the foot-lever the mechanism in connection with which the clutch is employed will be checked at the end of one complete revolution of the shaft 1, and the release of the foot-lever must be accomplished before it can be used for a subsequent release of the clutch member 9. Thus the desired operation of the mechanism is accomplished positively and mechanically. The adjustment of the parts to insure the checking of the movement of the driving-shaft does not depend upon any manual effort of the operator. Furthermore, the adjustment of the parts to insure the stopping of the mechanism does not depend upon springs, counterweights, or any analogous devices, but is accomplished by the positive contact of a trip-lug 12 with a return-arm 16 of the trip-lever, and the rotary movement of the clutch member 9 through one revolution cannot be accomplished without disposing the trip-lever to check the rotation of said clutch member at the completion of said revolution.

Thus it will be seen that an essential feature of my present improvement is the automatic return of the trip-arm to its normal or tripping position by the operation of the intermittently-movable part of the mechanism, (of that part which must rotate when the clutch is in operation,) whereby the positive adjustment of the trip to its engaging or operative position is a necessary result of the operation of throwing the clutch into engagement with the intermittently-movable part, said operation not depending in any way upon the operation of any other part of the mechanism. It will be understood, furthermore, that various changes in the form, proportion, and the minor details of construction may be resorted to without departing from the spirit or sacrificing any of the advantages of this invention.

Having described my invention, what I claim is—

1. In a clutch, the combination with the shaft, of a continuously-rotating member loose on the shaft, a shiftable member slidable upon the shaft toward and from the rotating member and provided with a fixed projection, a trip-lever provided with trip and return arms for alternate engagement by the projection on the shiftable clutch member, and adapted to be moved in one direction by the engagement of said projection with the return-arm, the trip-arm of said lever being provided with means for moving the shiftable member out of engagement with the continuously-rotating member, and a disconnected operating device for moving the trip-lever in the direction opposite to that in which it is moved by the projection on said shiftable member, substantially as set forth.

2. In a clutch, the combination with the shaft, of a continuously-rotating member loose on the shaft, a shiftable member slidable upon the shaft toward and from the rotating member, and provided with a fixed projection, a pivotal trip-lever having a pair of arms arranged respectively upon opposite sides of the shaft, and one of which arms has an interlocking engagement with said projection, and means for moving the trip-lever in a direction to disengage the interlocking arm therefrom, substantially as set forth.

3. In a clutch, the combination with the shaft, of a continuously-rotating member loose on the shaft, a shiftable member slidable upon the shaft and provided with a fixed projection, a pivotal trip-lever having spaced trip and return arms arranged respectively at opposite sides of the shiftable member, said trip-arm having a cam-face to engage with said fixed projection and thereby draw the shiftable member back out of engagement with the continuously-rotating member, and means for moving the trip-lever in a direction to release the shiftable member and permit its engaging with the rotating member, substantially as set forth.

4. In a clutch, the combination with the shaft, of a continuously-rotating member loose on the shaft, a shiftable member slidable axially upon the shaft toward and from the rotating member and provided with a fixed projection, a forked pivotal trip-lever supported in a fixed plane and receiving said shiftable member within the bifurcation thereof, one of the arms of the trip-lever having an interlocking cam engagement with the fixed projection on said shiftable member, and means for releasing the trip-lever from the fixed projection on the shiftable member, substantially as set forth.

5. In a clutch, the combination with the shaft, and a continuously-rotating member loose on the shaft, of a shiftable member slidable upon the shaft toward and away from the rotating member, and provided with a fixed projection, a trip-lever provided with trip and return arms for alternate engagement by the projection on the shiftable clutch member, and adapted to be moved in one direction by the engagement of said projection with the return-arm, the trip-arm of the lever being provided with means for moving the shiftable member out of engagement with the continuously-rotating member, and a disconnected operating device carrying a pivotal trip coöperating with one end of the trip-lever to provide for moving the latter in a direction opposite to that in which it is moved by the projection on said shiftable member, substantially as set forth.

6. In a clutch, the combination with the shaft, of a continuously-rotating member loose on the shaft, a shiftable member slidable upon the shaft and yieldingly pressed in an axial direction toward the rotating member, said shiftable member being provided with a fixed projection, a pivotal trip-lever having trip and return arms respectively arranged upon opposite sides of the shiftable member, means for moving the trip-lever in a direction opposite to that in which it is moved by the projection on the shiftable clutch member, and a friction device for yieldingly maintaining the trip-lever in either of its adjusted positions, substantially as set forth.

7. A clutch having continuously and intermittently rotating members, of which one is axially movable toward and from the other, and is yieldingly actuated to move it, when released, into operative engagement with the other, and a trip-lever provided with trip and return arms for alternate engagement by a projection on said axially-movable clutch member, and adapted to be moved in one direction by the engagement of said projection with the return-arm, the trip-arm of said lever being provided with means for moving the axially-movable clutch member to disengage it from the other clutch member, in combination with a shifting-lever having a pivotal trip 27 for engaging the trip-lever and imparting motion thereto only in the direction opposite to that in which said trip-lever is moved by the projection on said clutch member, a foot-treadle, and connections including a swinging arm, a link between the swinging arm and said shifting-lever, and a pitman connecting the foot-treadle with said swinging arm and having an adjustable connection with the latter, substantially as specified.

8. A clutch having continuously and intermittently rotating clutch members, of which one is capable of movement toward and from the other, and is yieldingly actuated to move it, when released, into engagement with the other, a trip-lever provided with trip and return arms in operative relation with a projection on said movable clutch member, the return-arm being adapted for engagement by said projection to move the trip-lever in one direction, and the trip-arm being provided with a cam for shifting said clutch member in opposition to its actuating devices, means for shifting said trip-lever in the opposite direction, and friction devices for yieldingly maintaining the trip-lever in either of its adjusted positions, substantially as specified.

9. A clutch having continuously and intermittently rotating clutch members, of which one is capable of movement toward and from the other, and is yieldingly actuated to move it, when released, into engagement with the other, a trip-lever provided with trip and return arms in operative relation with a projection on said movable clutch member, the return-arm being adapted for engagement by said projection to move the trip-lever in one direction, and the trip-arm being provided with a cam for shifting said clutch member in opposition to its actuating devices, and means for yieldingly holding the trip-lever in either of its adjusted positions, the same consisting of a friction hub or drum and a brake-shoe, substantially as specified.

10. A clutch having continuously and intermittently rotating clutch members, of which one is capable of movement toward and from the other, and is yieldingly actuated to move it, when released, into engagement with the other, a trip-lever provided with trip and return arms in operative relation with a projection on said movable clutch member, the return-arm being adapted for engagement by said projection to move the trip-lever in one direction, and the trip-arm being provided with a cam for shifting said clutch member in opposition to its actuating devices, and means for yieldingly holding the trip-lever in either of its adjusted positions, the same consisting of a hub or drum carried by the trip-lever, a brake-shoe encircling said hub or drum and attached to a fixed object, and adjusting devices for varying the pressure of the shoe upon said hub or drum, substantially as specified.

11. A clutch having continuously and intermittently rotating members, of which the latter receives motion from the former, a stop device normally located in operative relation with the intermittently-rotating member for checking the movement of the same, and movable out of operative relation therewith to release the same, and means, actuated, once for each complete revolution, by one of said rotating members, and operatively connected with said stop device for positively moving the latter into its normal position, substantially as specified.

12. A clutch having continuously and intermittently rotating members, of which one is movable into and out of operative relation with the other, a trip device having a shifting element adapted, when in its normal position, to remove said movable member from operative relation with the other, and means actuated by one of said rotating members and operatively connected with, for positively returning, said shifting element of the trip device to its normal position, in combination with means for moving said shifting element out of its normal position, and being automatically disengaged from said shifting element when the latter reaches its adjusted position, substantially as specified.

13. A clutch having continuously and intermittently rotating members, of which one is movable into and out of operative relation with the other, a trip device having a shifting element adapted, when in its normal position, to remove said movable member from operative relation with the other, and means actuated by one of said rotating members and operatively connected with, for positively returning, said shifting element of the trip device to its normal position, in combination with disconnected means in the path of which a member of the shifting element is normally arranged for imparting motion in one direction to said shifting element, and being automatically disengaged when said shifting element reaches its adjusted position, substantially as specified.

14. A clutch having continuously and intermittently rotating members, of which one is movable into and out of operative relation with the other, a trip device having a shifting element adapted, when in its normal position, to remove said movable member from operative relation with the other, and provided with a stop to positively check the movement of the intermittently-rotating member when shifted, and means actuated by one of said rotating members and operatively connected with, for positively returning, said shifting element of the trip device to its normal position, in combination with means for moving said shifting element out of its normal position to disengage the stop thereof from the intermittently-rotating member, and being automatically disengaged when said stop of the shifting element releases the intermittently-rotating member, substantially as specified.

In testimony that I claim the foregoing as my own I have hereto affixed my signature in the presence of two witnesses.

CHARLES ELMER BERTELS.

Witnesses:
LILLIAN REICHARD,
CHANCELLOR N. BERTELS.